United States Patent [19]
Seiner

[11] 3,951,899
[45] Apr. 20, 1976

[54] OPAQUE, MICROCELLULAR FILMS FROM LATEX COMPOSITIONS, PROCESS AND COMPOSITION FOR PREPARING THE SAME

[75] Inventor: Jerome A. Seiner, Pittsburgh, Pa.

[73] Assignee: PPG Industries, Inc., Pittsburgh, Pa.

[22] Filed: June 10, 1971

[21] Appl. No.: 151,735

Related U.S. Application Data

[60] Division of Ser. No. 48,199, June 22, 1970, Pat. No. 3,669,728, Continuation-in-part of Ser. No. 741,502, July 1, 1968, Pat. No. 3,764,364, Continuation-in-part of Ser. No. 745,433, July 17, 1968, Pat. No. 3,655,129.

[52] U.S. Cl. .................. 260/29.6 MH; 260/29.6 H; 260/29.6 TA; 260/29.2 R; 260/29.7 H; 260/29.7 T; 260/29.7 GP; 260/33.6 UA; 260/42.55; 427/331
[51] Int. Cl.² ..................... C08L 9/10; C08L 13/02
[58] Field of Search .............. 260/29.6 MH, 29.6 H, 260/29.6 RB, 29.6 RW, 29.6 TA, 29.2, 29.3, 29.4, 33.6 A, 2.5; 117/135 UA, 36.7

[56] References Cited
UNITED STATES PATENTS

| | | | |
|---|---|---|---|
| 2,961,334 | 11/1960 | Clancy et al. | 117/36 |
| 3,108,009 | 10/1963 | Clancy et al | 117/46 |
| 3,157,533 | 11/1964 | Clancy et al. | 117/156 |
| 3,347,702 | 10/1967 | Clancy et al. | 117/201 |
| 3,399,060 | 8/1968 | Clancy et al. | 96/1.4 |
| 3,445,272 | 5/1969 | Newton | 117/119 |
| 3,504,072 | 3/1970 | Ploetz | 264/112 |
| 3,637,431 | 1/1972 | Brenneman et al. | 117/155 UA |
| 3,655,129 | 4/1972 | Seiner | 239/60 |

*Primary Examiner*—Lucille M. Phynes
*Attorney, Agent, or Firm*—Frank J. Troy

[57] ABSTRACT

The disclosed invention relates to films from a novel latex mixture which are non-porous, microcellular and opaque in the absence of an opacifying agent. The preparation of the films of the disclosed invention comprises providing control techniques for entrapping a sufficient amount of a liquid non-solvent for the polymer in the polymer matrix of a latex after the continuous phase removal, so that upon evaporation of the non-solvent from a coalesced and tack-free polymer matrix, a resulting opaque and continuous, non-porous film is produced which will have minute, discrete and substantially closed voids and which is opaque in the absence of an opacifying agent such as pigment.

The disclosed invention also relates to opaque films with enhanced optical properties produced by the inclusion of pigments, fluorescent materials and optical brighteners in the opaque films in such a manner as to maximize their effectiveness therein.

14 Claims, 4 Drawing Figures

INVENTOR
JEROME A. SEINER

BY
ATTORNEY

OPAQUE, MICROCELLULAR FILMS FROM LATEX COMPOSITIONS, PROCESS AND COMPOSITION FOR PREPARING THE SAME

This application is a division of my copending application Ser. No. 48,199, filed June 22, 1970, now U.S. Pat. No. 3,669,728 and a continuation-in-part of my copending applications Ser. No. 741,502, filed July 1, 1968, now U.S. Pat. No. 3,764,364 and Ser. No. 745,433, filed July 17, 1968, now U.S. Pat. No. 3,655,129.

BACKGROUND OF THE INVENTION

Various techniques for rendering polymeric films opaque have been developed in the past. Each of these techniques seek to optimize optical opacity in its own way. For example, opaque films are most conventionally prepared by adding a pigment which acts as an opacifying agent to a solution of a film forming material which would otherwise be colorless or transparent when cast in a film. As will be more fully explained hereinafter the amount and size of the pigment particles generally are felt to be the criteria for optimum opacity.

Optical opacity, for example, the hiding power of a paint film, is achieved either by absorption of the incident light or by scattering of the incident light, or a combination of these two. Thus, black is opaque because it absorbs the light incident on it and white is opaque because it back scatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wave length of light. Scattering depends on the relative refractive indices of pigment and vehicle as well as on the particle size of the pigment relative to the wave length of incident light.

One simple description of the relation of the scattering and absorption to the resulting reflectance is that of Kubelka and Munk. At complete hiding, the following equation applies:

$$\frac{(1 - R\infty)^2}{2R\infty} = \frac{K}{S} \qquad \text{(Equation 1)}$$

wherein $R\infty$ is reflectance of a film so thick that a further increase in thickness does not change the reflectance, $K$ is the absorption coefficient and $S$ is the Kubelka-Munk scattering coefficient. No account is taken of the surface reflectances, and the equation applies only to internal reflectance.

The fractions contributed by more than one pigment in a system are additives as shown by the following equation:

$$\frac{(1 - R)^2}{2R} = \frac{C_1K_1 + C_2K_2 + C_3K_3...}{C_1S_1 + C_2S_2 + C_3S_3...} \qquad \text{(Equation 2)}$$

wherein $C_1$, $C_2$ and $C_3$ refer to the concentrations of pigments 1, 2, 3, etc.

When hiding is incomplete, the following equation applies:

$$R = \frac{1 - Rg(a - b\, ctgh\, b\, SX)}{a - Rg + b\, ctgh\, b\, SX} \qquad \text{(Equation 3)}$$

where $R$ is the resulting internal reflectance, $Rg$ is the reflectance of the substrate, $a$ is equal of $(S + K)/S$, $b = (a^2 - 1)^{1/2}$, $S$ is the scattering coefficient, $X$ is the thickness of the film in mils, and ctgh refers to hyperbolic cotangent.

The Kubelka-Munk scattering coefficient may be computed from the following equation:

$$SX = \frac{1}{b} Ar\, ctgh\, \frac{1 - aRo}{bRo} \qquad \text{(Equation 4)}$$

where Ar ctgh refers to the inverse hyperbolic cotangent, $Ro$ is the reflectance over a black substrate, of 0% reflectance, $a$ may be found from the relation, $$a = \frac{1}{2} \left[ R + \frac{Ro - R + Rg}{RoRg} \right]$$

and $b$ is determined as above. In this equation, $R$ equals reflectance over a white substrate and $Rg$ is reflectance of the substrate which is coated; or $a$ may be found from the following equation:

$$a = \tfrac{1}{2}\, [1/R\infty + R\infty]$$

$K$ may be found from the equation $K = S(a-1)$.

The Kubelka-Munk analysis is discussed in further detail by D. B. Judd, in "Color in Business, Science and Industry", John Wiley and Sons, New York, 1952, ppg. 314 – 338; and by D. B. Judd and G. Wyszecki in "Color in Business, Science and Industry", 2nd Edition, John Wiley and Sons, New York, 1963, ppg. 387 – 413, the disclosures of which are incorporated herein by reference.

Various other techniques have been developed in the art for preparing opaque films which rely for opacity upon the presence of a large number of voids in the films. Such may be prepared for example, by depositing a film from an emulsion, e.g., either an oil-in-water or a water-in-oil emulsion. When a water-in-oil emulsion is used, i.e., one in which minute droplets of water are dispersed in a continuous phase of a film forming material — the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When the oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is formed into a thin layer and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. A film is then formed from this aqueous dispersion and water is evaporated causing entrapment of minute droplets of the organic solvent in the polymer. The film obtained is then washed to dissolve the entrapped minute droplets of solvent and the film is dried.

Still another technique for obtaining porous, opaque, non-pgimented films is set forth in U.S. Pat. No. 2,961,334. Basically, this process contemplates adding a polymeric material to a liquid solvent to thereby form either a solution or a quasi-solution (i.e., as by peptizing). To this continuous phase is added a liquid which has a higher boiling point than the liquid solvent and which is a non-solvent for the film forming polymeric materials. The resulting emulsion is then applied to a substrate whereupon an opaque film is formed after first evaporating the water and then the non-solvent.

Various techniques have also been developed to modify latex compositions by the addition of a liquid non-solvent for the polymeric material of the latex. One such technique is disclosed in U.S. Pat. No. 3,092,601. This patent discloses a unique method for preparing selfinduced three-dimensional patterns from coating compositions containing a polyvinyl acetate latex, a pattern forming agent (which is a non-solvent for the polymeric material) and various additives. In addition, there may be added a small amount of a pigment or non-leafing metallic powder. Although it is disclosed that the polyvinyl acetate may be modified by copolymerization with up to 20% of another vinyl monomer, or plasticized with a suitable plasticizer, the compositions of the disclosed invention should always be those which do not coalesce well at room temperature in order to obtain the desired self-induced three-dimensional patterns. Therefore, the pattern forming agent which is usually a non-solvent for the polyvinyl acetate polymer acts only as a pattern forming agent and not as a void forming agent which would produce opaque films since the polymeric material would not coalesce enough to entrap sufficient amounts of nonsolvent to enable the resulting coating to become opaque upon the later removal of the non-solvent.

Another technique which was recently disclosed in U.S. Pat. No. 3,445,272, relates to the preparation of porous elastomeric coatings from a suspension of an latex of elastomeric polymers containing a waterimmisicble liquid which is a non-solvent for the elastomeric polymer. The composition is applied as a coating and the water and non-solvent are evaporated to leave behind small open cell pores in the resulting coating. While the open cell porous coatings have significant utility when used for shoe uppers, battery separators and the like, it is generally not desirable to employ a highly permeable coating as a protective paint.

Although the above described techniques have proved useful in producing coatings or films which accomplish certain results, no techniques have been disclosed for obtaining a paint a non-porous, microcellular coating which is continuous and opaque in the absence of an opacifying pigment.

Furthermore, the process described above which starts with an aqueous dispersion (i.e., a latex), rather than a solution or quasi-solution of the polymer uses a water-soluble polymer solvent for the pore forming ingredient. This polymer solvent must utimately be washed away leaving an open celled structure. The problems attendant with such a solvent process are well known in the art. For example, the process is limited to the use of polymer solvents which are also water soluble. This condition removes a degree of flexibility from the operation. The washing steps, as another example, add an expense to the process. Further difficulties arise in the formation of open cells since such cells result in high permeability of the final film. Although convenient for some purposes, high permeability is undesirable for many film applications especially in the area of water-repellant and sealing paints.

In summarizing the above-described process for forming opaque films, it may be stated that those processes which contemplate the formation of closed cells in a film generally use the opacifying technique of evaporation to remove the discontinuous phase liquid from the film to thereby prevent rupture of the cells and maintain their closed integrity while at the same time rendering the film opaque. Preferably, the discontinuous phase liquid used is one which will permeate readily through the polymer matrix of the film so that evaporation may be achieved easily and economically. In many processes which envision the eventual formation of open cells or voids, a washing step must be used to wash-out or extract the discontinuous phase liquid from a film and thereby opacify it.

Many of the above-described processes assume the use of good film formers or soluble film formers in order to obtain their desired results. Thus, in this respect, all of the processes are relatively inflexible in their application since many desirable polymers which are not good film formers or which are not soluble film formers at normal temperatures are thereby eliminated from use.

Each polymer has its own "glass transition temperature" (Tg); this term is well known in the art and is generally used to define or describe a temperature above which the polymer has acquired sufficient thermal energy for molecular rotational motion or considerable torsional oscillation to occur about the majority of bonds in the main chain. This term is also used to define a "minimum film forming temperature" above which the polymer has enough internal energy and flow to form a film. In effect, then, the term "glass transition temperature" or "minimum film forming temperature" describes a type of internal melting point for a polymer, not a phase change, at and about which the polymer preserves the outward appearance of a solid but at the same time behaves much like a liquid in its ability to undergo plastic flow and elastic deformation. For the purposes of this invention, the term "glass transition temperature" may be used interchangably with and defined as the "minimum film forming temperature" of a polymer. Although theoretically this temperature is probably an exact point, in practice this point actually turns out to be a small temperature range due to the inability to achieve ideal equilibrium conditions.

For this definition, it is seen that at any given temperature T, a particular polymer and thus its latex may be either a good film former, nonfilm former, or marginal film former depending upon its Tg point (i.e., minimum film forming temperature). For example, if T is taken as room temperature (68° – 75°F.), then any polymer having a Tg substantially greater than room temperature (for example, 90°F.) will be a non-film former at temperature T, while any polymer with a Tg substantially below room temperature (for example, 66°F.) will be a good film former at temperature T. Between these two extremes will be polymers that are marginal film formers. The term "marginal film formers" for purposes of this invention is herein used to describe a polymer existing at a temperature T which is generally within or about the Tg point of the polymer and which is intermediate a good film former and a non-film former in its flow characteristics. It is, of course, understood that the cutoff point between a non-film former and a marginal film former on the one hand and a marginal film former and a good film former on the other hand is not a specific point, but rather is a graduation or range of temperatures within which different amounts of polymer flow are occurring in an attempt to form a film.

For the purposes of this invention and in order to conveniently describe the ability of any particular polymer to attempt to form a film, the term "flow characteristics of a polymer" will be hereinafter used. This term may thus be defined as describing those characteristics of a polymer or polymeric material in a latex which tend to form the material into a coalesced mass or film.

SUMMARY OF THE INVENTION

This invention is based upon the discovery that latex compositions containing dispersed polymer particles and a non-solvent for the polymer, by entrapping a sufficient amount of non-solvent for the polymer in the polymer matrix after the continuous phase is removed produce upon evaporation of the non-solvent from the coalesced and tack-free polymer matrix an opaque, continuous, non-porous film. These films have minute, discrete and substantially closed voids which provide a useful degree of opacity in the absence of an added opacifying agent such as pigments. A film is generally considered to have useful opacity when it exhibits a Kubelka-Munk scattering coefficient greater than 0.5 reciprocal mils at 4400 angstroms and greater than 0.1 reciprocal mils at 5600 angstroms.

One method for entrapping a sufficient amount of non-solvent in the polymer matrix subsequent to continuous phase removal is to control the flow characteristics of the polymer particles during the removal of the continuous phase or water from the system after the latex composition has been applied to a substrate. By this control, the final permeability, porosity, and opacity (upon later non-solvent removal) of the final film may be specifically chosen and varied. The particular control technique used depends upon the type of polymer latexes chosen. Generally, it may be stated that for non-film formers, the technique of adding good film formers, marginal film formers, coalescers, plasticizers and/or polymeric thickeners may be used. For marginal film formers, the technique of adding good film formers, coalescers, plasticizers, and/or polymer thickeners may be used. When using good film formers, flow inhibiting agents, marginal film formers, and non-film formers may be added in a predetermined amount to effect a desired result.

Temperature control during water removal is another technique generally applicable regardless of the ability of the polymer to form films at room temperature.

A preferred control technique which is applicable to all the systems described above is to employ a non-solvent for the polymer having sufficiently low volatility that the resulting coalesced film, upon continuous phase removal, becomes tack-free prior to substantial evaporation of the non-solvent. This technique is particularly preferred when using good film formers, since by employing a non-solvent of low volatility, thickeners and other flow retardants may not be necessary. If the nonsolvent does not have sufficiently low volatility when using a good film former, alone, the voids formed by the non-solvent may not be able to withstand the flowing of the film during the final drying process. In other words, the flowing of the film will collapse the voids and produce a clear film.

When the film has reached a tack-free state, it will have sufficient gel structure so as to not flow and the remaining non-solvent can be evaporated to form the voids which will not collapse.

In the paint and coatings industry, a common method for determining if a film is tack-free is by the use of the "cotton test" or "Cotton Fiber Method". When a film is tack-free, cotton threads no longer adhere to the film. Specifically, this tack-free state of the film can be determined by A.S.T.M. Method D 1640-65T-5.2.1 whereby cotton fibers are dropped onto the film at regular drying intervals on a specified portion of the film. The film is considered tack-free when the fibers can be removed by blowing lightly over the surface of the film. Another method for determining whether the film is tack-free is by employing the "Powder Method" described as A.S.T.M. D 1640-65T 5.2.2. This method is conducted by depositing finely divided calcium carbonate (pigment grade) on the film at definite intervals during the drying period and after the film has dried to a tack-freee state, the pigment can be removed by blowing with a gentle stream of air and wiping with a soft rag or camel hair brush. The film is considered tack-free when the pigment can be removed completely.

The invention also provides for the inclusion of pigment, dyes, fluorescent materials, and optical brighteners in the above-described films in such a way as to maximize their effectiveness therein.

DETAILED DESCRIPTION OF THE INVENTION

This invention contemplates within its scope several methods, compositions and products made therefrom, for producing opaque films of various characteristics. By employing these methods and compositions, opaque films may be made from latexes of polymeric materials regardless of whether the polymeric materials are clasified as non-film formers, marginal film formers, or good film formers.

The latex compositions of the invention comprise particles of coalescable polymer dispersed in water, the composition also containing a non-solvent for the polymer. The non-solvent is of sufficiently low volatility and is present in sufficient amount so as to produce upon drying a continuous, non-porous microcellular film with minute closed voids in the film matrix. These dried films are opaque, even in the absence of added opacifying agent such as pigment.

The basic method for producing films as contemplated herein comprises applying to a substrate the aforesaid latex composition and removing the water, which comprises the continuous phase of the latex. During this removal, a sufficient amount of non-solvent is entrapped in the coalesced polymeric material before it becomes tack-free so that upon evaporation of the remaining non-solvent, the resulting film is opaque in the absence of an opacifying agent, having, for example, a Kubelka-Munk scattering coefficient as described above.

The amount of non-solvent entrapped in the polymeric material before it becomes tack-free can be controlled by several techniques. One technique is to control the flow characteristics of the polymeric material during water removal so as to accelerate the time at which the resulting film becomes tack-free. The flow characteristics of the polymeric material may be controlled by one of several techniques which will be described in greater detail hereinafter.

Another technique, which is a preferred embodiment of this invention is to employ a liquid having low volatility as the non-solvent. For example, when using a good film former, the non-solvents should boil substantially above about 400°F. (i.e., the proportion of the non-solvent liquid boiling below 400°F. should be small). Instead of employing a very low volatile liquid as the non-solvent, it is possible to incorporate a larger amount of liquid non-solvent in the latex composition so that there remains sufficient non-solvent in the polymeric material when it becomes tack-free, so that upon evaporation of the remaining non-solvent, the resulting film will have the desired opacity. However, it will be understood by those of skill in the art that often it is not economically feasible to employ excessive amounts of non-solvent in the composition. The amount of non-solvent added to the composition can be decreased by selecting a liquid which has a higher boiling range.

It will be understood, of course, the amount of control effected depends upon the type of polymeric material used and the degree of uniformity desired in the resulting film. However, it may be stated that for the purposes of this invention, which ultimately seeks to obtain opaque films, the amount of control is to an extent sufficient to form a film having entrapped therein minute or very small droplets of the non-solvent. The film at this point, i.e., having minute droplets of liquid entrapped therein, is not generally opaque but rather is usually transparent or translucent. In this form, the film may generally be considered an intermediate product. However, this intermediate product has utility in and of itself and may be used in this form for future removal either of the entire amount of the non-solvent to make an opaque film or only a partial amount of the non-solvent to make various film designs. In a preferred method, the operation forms a fully white and opaque film by removing the minute or very small droplets of non-solvent. In either case, the final or eventual removal of the non-solvent droplets result in the formation of tiny or minute voids in the film such that the film is non-porous and microcellular.

The term "latex" as used herein is a term well known in the art and describes a two-phase system. The first phase is referred to as the continuous phase and is made up essentially of water and at times certain soluble additives to effect various results, (e.g., emulsifying agents). A preferred additive is a glycol, such as ethylene or propylene glycol, which improves the flow characteristics of the wet film. The second phase is a distinctly separate phase dispersed in the first phase, referred to as the discontinuous phase since it comprises a plurality of particles of polymeric materials. Although the polymeric particles may be of any convenient size, within the meaning of the term, the particles must form a distinct second phase as opposed to solutions and quasi-solutions. It is therefore readily seen that this type of water dispersion adds much commerical flexibility to a film making system when compared with a system which requires the great bulk and non-flexibility of a solution or quasi-solution.

The polymeric particles can be particles of any coalescable polymer which can be stably dispersed in water. By "coalescable polymer" is meant a polymer which, either alone or in the presence of coalescing aids such as plasticizers or the like, form a continuous film at the temperature of use. Ordinarily, polymers which are coalescable at room temperature are preferred, but others which require heating or particular conditions to provide continuous films can also be employed. Mixtures of polymers, which may or may not be coreactive, are also useful; such mixture can be either in the same particles or in different particles dispersed in the composition.

Among the polymers which can be utilized are homopolymers and copolymers of various monomers, such as vinyl esters of saturated carboxylic acids, for example, vinyl acetate, vinyl propionate, or the like; alkyl or aryl esters of unsaturated carboxylic acids, including acrylates and methacrylates such as ethyl acrylate, butyl acrylate, 2-ethylhexyl acrylate, methyl methacrylate, phenyl acrylate, etc., and maleates and fumarates such as dimethyl maleate, butyl hydrogen fumarate, methyl ethyl maleate, and the like; unsaturated hydrocarbons, including aliphatic and aromatic monomers such as ethylene, butadiene, styrene and vinyl toluene; vinyl halides, such as vinyl chloride, vinyl bromide and vinylidene chloride; unsaturated nitriles, such as acrylonitrile and methacrylonitrile; unsaturated amides, such as acrylamide, N-substituted acrylamide, and methacrylamide; unsaturated carboxylic acids, such as acrylic acid, methyacrylic acid, maleic acid or anhydride, and fumaric acid; and othe polymerizable monomers of various types.

In many cases preferred polymers comprise combination of the above monomers, e.g., vinyl acetane-alkyl acrylate copolymers, alkyl acrylate-styrene copolymers and styrene-butadiene copolymers.

Other coalescable polymers which are useful under appropriate conditions include alkyd resins, both oil-modified and non-oil modified, and including alkyds modified by reaction with materials such as styrene or acrylic monomers; phenolic resins, i.e., condensates of a phenol and an aldehyde; epoxy resins, including esterified epoxies and epoxidized oils; polyurethanes, where these are made so as to be stably dispersed in water; aminoplast resins, i.e., aldehyde condensates of melamine, urea, benzoguanamine, or similar compounds; naturally occurring materials, such as rubber, shellac, casein etc; and other polymers which are coalescable and water-dispersible.

The preferred coalescable polymers for use in the invention are acrylic polymers, i.e., polymers containing one or more acrylates or methacrylates, copolymers of vinyl acetate with a minor amount of a vinyl halide or an ester of an unsaturated acid, and copolymers of vinyl aromatic hydrocarbons with alkyl acrylates, dienes or other monomers.

The specific latexes contemplated for controlled film forming use herein include as their discontinuous phase coalescable polymeric materials which may be non-film formers marginal film formers, and/or good film formers. Some examples of non-film formers at room temperature (20°–25°C.) include vinyl acetate homopolymers (e.g., "Elvacet 84-110"), latex homopolymers of styrene, latex homopolymers of methyl methacrylate or latex copolymers of styrene and methyl methacrylate. Preferred marginal film formers at room temperature include a butadienestyrene latex such as that known as "Lytron 5202" and certain copolymers of ethyl acrylate and methyl methacrylate or styrene. Examples of good film formers at room temperature include acrylate polymers such as "Rhoplex AC-34", vinyl acetate copolymers such as the vinyl acetate copolymer latex of 75% vinyl acetate and 25% dibutyl maleate, and a vinyl acetate copolymer latex of 75% vinyl acetate and 25% ethyl hexyl acrylate.

Other copolymers which have been found to be useful include the copolymer of 35% methyl methacrylate and 65% ethyl acrylate ("Rhoplex AC-22"), the copolymer of 70% methyl methacrylate and 30% butyl acrylate ("Rhoplex AC-61"), the copolymer of 43% methyl methacrylate, 55% butyl acrylate and 2% methacrylic acid ("Rhoplex AC-388"), the copolymer of 65% butyl acrylate and 35% acrylonitrile ("Dow 358"), the copolymer of 60% polyvinylchloride and 40% 2-ethyl hexyl acrylate ("Geon 450 × 20"), the copolymer of 45% polyvinylchloride and 55% ethyl acrylate ("Geon 460 × 1"), the copolymer of 42% ethyl hexyl acrylate, 50% styrene, 5% acrylonitrile and 3% methacrylic acid ("Ucar TCX-3410") and the like.

As it can be seen from the foregoing non-limiting list, a wide variety of latices of water-insoluble film forming polymers and copolymers have been found useful. Although generally any such polymeric material can be used, non-elastomeric film-forming polymers and copolymers are preferred since they have a better capability of maintaining the necessary rigidity to entrap the non-solvent in the coalesced film, and provide better resistance to deformation of the dried film and the microvoids therein. Most preferred films have an extensibility of less than about 400%, i.e., they undergo permanent deformation at elongations above about 400%.

The terms "film forming" and "coalesce" used herein refer to the ability of a polymeric material dispersed in the aqueous continuous phase of the latex to join together in coherent films as the continuous or water phase is removed from the latex.

Without the control techniques, a non-film former in latex form mixed with non-solvent would not form a film upon removal of the water not coalesce enough to entrap sufficient amounts of non-solvent to enable the resulting non-film coating to become opaque upon the later removal of the non-solvent. Marginal film formers in latex form generally form some type of semi-continuous film having entrapped therein some small amount of non-solvent, but without a control technique the resulting continuity and opacity depends solely upon the particular polymeric material used. Good film formers during coalescence flow very well and thereby form continuous films, and in order for there to be adequate non-solvent entrapped in the film, the non-solvent should be of sufficiently low volatility such that film formation is essentially complete, i.e., the film is tack-free, prior to evaporation of the non-solvent.

With the control techniques of this invention both opacity and film continuity can be varied and optimized over a wide range for any given coalescable polymer system which will not decompose prior to reaching its flow point. These control techniques assume five basic forms as follows:

Firstly, the temperature of the applied mixture may be accurately controlled during water removal such that the system during flow or coalescence is held at a temperature a specific number of degrees from its glass transition temperature (Tg) or minimum film forming temperature. This first control technique is operative for all the coalescable latex systems contemplated herein whether they be non-film formers, marginal film formers, or good film formers. For example, if a non-film former latex system is used to achieve a substantially continuous film of optimum opacity, the system's Tg point is first determined by conventional techniques. The latex-non-solvent mixture is then applied to a series of substrates and by simple trial-and-error experimentation using various temperatures above th TG point, optimization of opacity and continuity can be achieved. Similar procedures may be used for good film formers, which usually require a lowering of the temperature of the system, and marginal film formers, which merely require careful control of temperature about their Tg point. Of course, it is understood that in the above described temperature techniques which use temperatures higher than the boiling point of water, the nonsolvent liquid should be less volatile than water at the highest temperature used to control the flow characteristics. This insures that the non-solvent will become entrapped during control rather than evaporate off along with the water.

The second technique contemplated for controlling the flow characteristics of a latex system generally comprises adding coalescers, plasticizers, and/or polymer thickeners to the system in order to increase flow. Although this technique basically applies to marginal film formers, it may also be used to achieve both continuous and semi-continuous films from latexes of the non-film forming type.

The coalescers, plasticizers, and thickeners contemplated for use herein include those well known to the art, the choice depending upon the particular polymer component of the latex. Some examples of coalescers which may be useful are ethers high boiling alcohols, esters and ketones. Some examples of plasticizers are dibutyl phthalate, butyl benzyl phthalate, tricresyl phosphate and polyethylene glycol. Some examples of thickeners are carboxy-methyl cellulose, hydroxy ethyl cellulose, maleic acid styrene copolymers, methyl methacrylate, methyacrylic acid copolymers and copolymers of maleic anhydride and methyl vinyl ether.

The third technique contemplated for controlling flow characteristics generally comprises adding to the latex system (i.e., either before or after the non-solvent is added) various flow-inhibiting agents which retard teh tendency of the particles during water removal to form a film. This technique is generally applicable when good film forming latexes are used to thereby prevent excessive flow and thereby insure the entrapment of non-solvent droplets. However, such a technique finds limited use with upper region marginal film formers when semi-continuous films are desired. Optimization of this technique, as in all of the techniques discussed herein, may be arrived at through routine experimentation. Some examples of the flow-inhibiting agents contemplated for use in this invention are such materials as silica powder, clay, pigments and mixtures thereof.

The fourth basic control technique contemplated for use herein generally comprises adding either one or more non-film formers and/or marginal film formers to a good film forming latex system or adding one or more good film formers to a marginal film forming or nonfilm forming latex system to thereby control the flow of the resulting film forming composition. The additives which effect the desired control may be dry pigments or may themselves be latexes. For example, a non-film forming latex non-solvent mixture may have its flow characteristics enhanced by adding thereto a sufficient amount of a good film former to achieve optimum opacity and a desired film continuity. It is, of course, understood that this technique also contemplates the addition of marginal film formers as well as mixtures of marginal film formers and various other types of film formers to achieve the desired effects. Examples of applicable additives are those polymers exemplifying the various types of film formers used as the basic latexes of the applied mixture hereinbefore set forth.

A fifth technique contemplated for use herein to control the entrapment of the non-solvent in the film matrix of a good film former upon removal of the continuous phase generally comprises the use of a non-solvent having sufficiently low volatility such that the film is essentially tack-free prior to evaporation of the non-solvent. These non-solvents generally substantially boil higher than about 400°F., that is, most of the non-solvent (which ordinarily is a mixture boiling over a range) boils above that temperature. Since these solvents are of such low volatility, the good film former undergoes substantial film formation and becomes tack-free prior to the evaporation of a majority of the non-solvent.

The above discussed techniques exemplify basic methods useful for controlling the flow characteristics of a film during continuous phase removal. It can be seen, however, other control methods and variations and combinations of the techniques described also can be used. For example, the temperature technique can be used with the inhibiting technique to achieve further optimization for various systems which require extremely careful control. The other techniques may also be used in combination with one another or all the techniques may be used together if so desired or found necessary.

The above-described controls form an inportant part of the overall ability optimum opacity and film continuity. Another important factor in optimizing a desired result is the amount of liquid nonsolvent added to the latex. For example, if too much non-solvent is added, the resulting film will be discontinuous. On the other hand, if too little non-solvent is added in insufficient number of voids will be formed and thus the desired opacity of the film is not achieved. The only adapting limitation on these control techniques when used in this invention is that they should control the flow characteristics of the polymer material sufficiently such that enough non-solvent is entrapped in discrete closed cells so that, upon evaporation of the non-solvent will result in the film becoming opaque.

The application of the polymeric material to a substrate in this technique may be done by any of the conventional methods, such as by rolling, brushing, dipping, or spraying. The removal techniques contemplated herein are those techniques which are conventional in the art. For example, both water removal and liquid non-solvent removal may be effected by simple evaporation at room temperature or by forced air or heated air evaporation. Heating or vacuumization of the system to achieve both water and non-solvent removal may also be used.

A film having optimum opacity, for practical purposes, may be described as a film having a Kubelka-Munk scattering coefficient greater than 0.5 reciprocal mils at 4400 angstroms and greater than 0.1 reciprocal mils at 5600 angstroms. At this optimum point, the average diameter of the voids generally has been found to be less than about 7 microns, although good opacity may be achieved with void diameters as high as 30 microns. Therefore, for the purposes of this invention, the amount of non-solvent mixed with the latex should not be so great as to effect a discontinuous film upon removal of the water from the system but at the same time must be great enough so that the resulting film will at least approach the described optimum opacity characteristics. Given the proper amount of liquid non-solvent, then, the various control techniques as above described will be corelated with this amount of non-solvent, in order to achieve the desired result.

To obtain films which have an optimum scattering coefficient as described above, it has been found desirable to employ compositions having a weight ratio of non-solvent to polymer solids of from about 0.10 to about 5 parts per part of polymer. It will be understood by those of skill in the art that for some systems other ratios will be applicable. For example, if the continuous phase contains a higher boiling component (e.g., glycol), a larger amount of non-solvent will be required. On the other hand, if a large amount of a flow inhibiting agent is employed, a lesser amount of non-solvent may be required to obtain a film having an optimum Kubelka-Munk scattering coefficient as described above.

The non-solvents liquid contemplated for use herein are non-solvents for the polymeric materials in the latex and generally have a boiling point above 100°C. These non-solvent liquids may be either miscible or immiscible in the water phase of the latex and when added to the latex may be added alone or along with various additives, such as an emulsifying agent.

The basic requirements for the non-solvent are that it be dispersible in water and less volatile than water and that it be a non-solvent for the coalescable polymer. It is preferred that the non-solvent be volatile or at least volatizable so that the non-solvent can be vaporized when it is desired to remove it and produce microvoids in the films. Heat or low pressures can be employed and thus non-solvents of very high boiling points are very useful up to the melting point of the coalescable polymer, or even higher. Sublimable solids can also be used under appropriate conditions while essentially volatile non-solvents can also be useful, these require removal by extraction or similar means and thus are relatively undesirable. It will be understood, however, that each polymer or copolymer will have its own series of usable and optimal non-solvents. Those most suited for any particular latex system may be readily selected by the skilled artisan on the basis of the known physical properties of liquids and polymers. One method which may be employed in selecting the optimum non-solvent for a particular latex system is the method of Hansen ("The Three Dimensional Solubility Parameter and Solvent Diffusion Coefficient and Their Importance in Surface Coating Formation" Copenhagen, Danish Technical Press, 1967) to determine liquids which will not solubilize the particular polymer selected. Once these liquids are ascertained, the solubility parameters found in the work of Hoy ("Tables of Solubility Parameters," Union Carbide Corporation, South Charleston, West Virginia, May 31, 1967) may be utilized. The work of Hoy tabulates the relative evaporation rates of liquids wherein a non-solvent can be selected which has a low enough volatility to remain in the coating long enough to form voids before evaporating.

An example of utilizing the foregoing method can be illustrated by selecting poly(vinyl acetate) as the latex polymer system. The Hansen parameters for this system are $\Delta d = 9.3$, $\Delta p = 5.0$, $\Delta h = 4.0$, and $R = 4.9$. Thus, the only practical materials outside this large solubility sphere are the water soluble liquids such as glycols, alcohols, amines, etc, and the non-polar aliphatics such as hexane, cyclohexane, carbon tetrachloride, etc. Since water solubles are not preferred, the non-polar aliphatics would be selected. Referring to the Hoy tabulation of relative evaporation rates (which are based upon butyl acetate as 100) it can be seen that the aliphatic hydrocarbon such as decane (B.P. 172°C., relative evaporation rate = 12.96), undecane (B.P. = 193°C., relative evaporation rate = 4.41) and dodecane (B.P. = 214°C., relative evaporation rate = 1.42) are all reasonable non-solvents for the poly(vinyl acetate) latex system. A commercially available liquid non-solvent which will simulate these pure compounds is ordinarily then chosen and utilized.

Some examples of non-solvents which have been found particularly useful are odorless mineral spirits, high flash aliphatic naphtha, naphthenic mineral oil, neat's foot oil, pine oil, and the like. The odorless aliphatic mineral spirits and high flash aliphatic naphthas generally have a boiling point range of from about 300° to about 600°F., preferably from about 400° to 550°F. when employing a good film former without the addition of flow inhibitors. Typical mixed aliphatic-aromatic compounds which may be employed as non-solvents are phenyl cyclohexane, triethyl benzene, phenylpropane and the like. Various other compounds may be employed as non-solvents, such as dicyclohexyl amine, isoamyl bromide, trichloropropane, methyl benzyl ketone, allyl butyrate and the like.

The emulsifying agents which may be employed in producing the latexes of the invention are conventional and well known. Preferred emulsifying agents are alkyl aryl polyether polyols, such as the surfactant known commercially as "TX-305", which is a poly(oxyethylene)octyl phenol.

Various other materials known in the coatings industry may also be added to the compositions of this invention to achieve particular desired results. Among some of the materials which may be added to the compositions of this invention are fungicides, mildewcides, surfactants, flow modifiers, thickeners, free flow stabilizers, anti-skin agents, antifloculants, pH stabilizers and various other additives known by those of skill in the art.

When some of the foregoing additives are added to the composition, care must be taken to insure that sufficient non-solvent will be entrapped in the polymeric material prior to the time at which the material becomes tack-free in order to provide sufficient void formation and to obtain a film having the desired Kubelka-Munk scattering coefficient upon the evaporation of the non-solvent.

The selection of the appropriate additives for films which will eventually contain a plurality of micro-droplets of non-solvent when the films have coalesced during an intermediate period is a refinement wherein several factors must eventually be compatible with a universal colorant tinting system. Thus, surfactants which are mainly water soluble are much less effective than those which have marginal water solubility and fairly good oil solubility. It is believed that the reasons for this is the probability of the non-solvent stealing surfactant from the alkyd compatible tints. It has unexpectedly been found that the marginally soluble surfactants in the compositions of this invention reduce the likelihood of this occurrence. Thus, the marginally soluble surfactants do not flocculate the colored pigments.

The selection of an appropriate anti-foam is generally an easier task when employing the compositions of this invention as compared to many prior art compositions since the non-solvent present tends to reduce the foaming tendency of the latex. The only particular consideration required is to provide a system which will not flocculate the colorants. However, if it is desired to add freeze-thaw stabilizers or wet-edge lengtheners, special precautions may be necessary since these additives have a tendency to lengthen the dry time of the film. Therefore, when additives such as ethylene or propylene glycol are added to a polymeric material which is not plasticized by these materials, non-solvent of lower volatility should be used since it is important to maintain a major portion of the non-solvent droplets in the film until it has reached a quasi-rigid form, i.e., the tack-free state referred to hereinabove. Similar considerations must be taken if coalescing aids having low volatility are added to the system. In other words, the choice of non-solvent must be modified to take into account the extended flow time so as to maintain a period of quasi-rigid film non-solvent entrapment in the coalesced film.

When a thermosetting or curable polymer has been used in the preparation of a film by any one of the above techniques cross-linking of the film may be effected, either by simply heating the film, or by adding various well known cross-linking agents and thereafter curing the film. Various methods known by those of skill in the art can be used, such as heat, moisture, oxidation, catalysis, and radiation, depending upon the type of polymer used. Cross-linking agents may be co-reactive resins, such as aminoplast resins. Another example of a cross-linking agent is toluene diisocyanate, which when used with a vinyl acetate polymer or with other copolymers containing hydroxyl groups is emulsified into the latex just prior to application and thus will effect a cross-linking structure in the film thereby to cure it. Cross-linking can also be effected by treatment of suitable films with ionizing irradiation (e.g., accelerated electrons) or with ultraviolet light, or by similar techniques.

Figure 1:
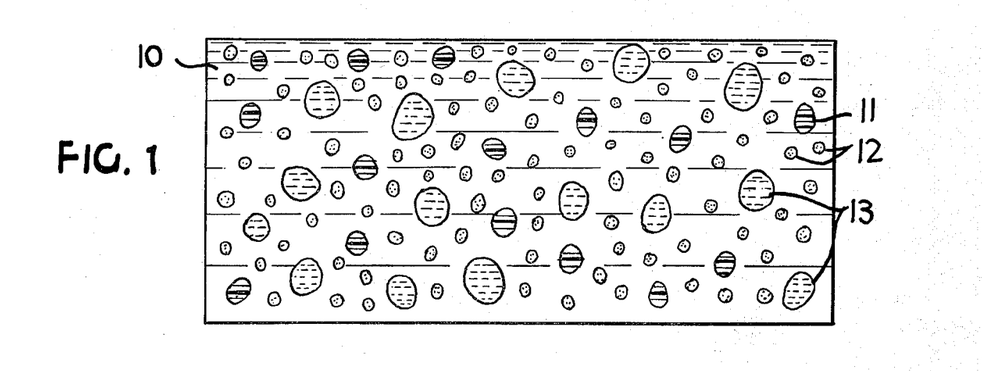
FIG. 1 is a greatly enlarged cross-sectional view of a latex composition of the invention, showing droplets of coalescable polymer and non-solvent dispersed in an aqueous continuous phase.
Figure 2:
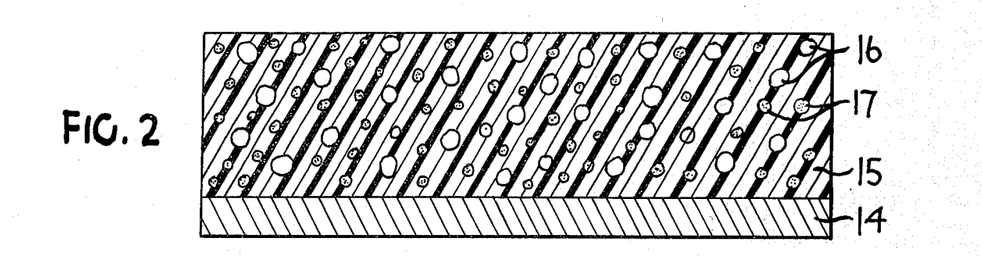
FIG. 2 is a greatly enlarged cross-sectional view of a dried film produced from a latex composition such as that in FIG. 1.

Illustrating the latex compositions of the invention and the films made therefrom are the drawings herein in which FIG. 1 shows that latex and FIG. 2 the film. In FIG. 1, the aqueous continuous phase 10 contains dispersed particles of coalescable polymer 11 and larger droplets of non-solvent 12. In FIG. 2 the substrate 13 has thereon a dried film of the latex composition in which the polymer matrix 14 contains minute voids 15.

The present invention also includes incorporating within the various above-described films, pigments, dyes, fluorescent materials and optical brighteners so as to add various characteristics, such as to enhance opacity, color, brightness, and fluorescence to these films.

Figure 3:
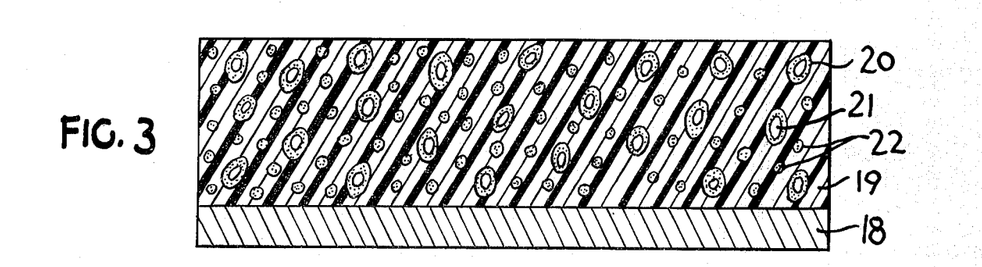
FIG. 3 is a greatly enlarged cross-sectional view of a film made in accordance with one embodiment of this invention wherein a dye material is deposited on the interfaces of the film voids.

One method of incorporating dyes within films for purposes of this invention comprises the steps of dissolving the dye in the liquid non-solvent. The non-solvent-dye solution is then added to a suitable latex and an intermediate film having dispersed therein minute droplets of the liquid non-solvent-dye is formed. Upon the removal of the non-solvent from the intermediate product, as by evaporation, the dye material is precipitated or left as a solid distributed upon the internal surface of the voids formed when the non-solvent is removed. The resulting product is exemplified by FIG. 3, wherein 16 is the substrate, 17 is the film of polymeric material and 18 is a dye distributed on the internal surfaces of the minute voids 19.

Other methods may be used to locate the dyes within the above-described films. In many instances, these methods result in the dyes being located within the matrix of the film rather than in the voids.

Many dyes suitable for use in this invention are well known in the art and include both oil and water soluble dyes. Some examples are flushed alkali blue, nubian resin black, calco oil blue ZA, and nigrosive black. In those instances where water soluble dyes are used, the resulting film will in most instances have the dye dispersed in its matrix.

Figure 4:
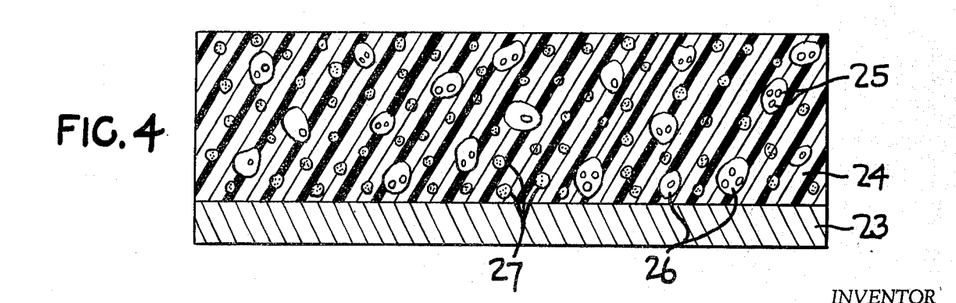
FIG. 4 is a greatly enlarged cross-sectional view of a film made according to another embodiment of this invention wherein pigment particles are dispersed within the film's voids. In the drawings, the proportions of the components are not drawn to scale.

Pigments may be incorporated into the films of this invention by a number of applicable techniques. For example, when using coloring pigments, on preferred technique comprises dispersing the pigment with a liquid-non-solvent after the particles are ground to a fine powder. This non-solvent-pigment dispersion is then added to a suitable latex and any one of the above-described control techniques may then be used to form a film. Upon final removal of the non-solvent liquid, as by evaporation, the pigment particles are distributed within the voids formed as the non-solvent evaporates. Distribution of pigment particles in this manner is illustrated by reference to FIG. 4 wherein 20 is the substrate, 21 is the film of polymeric material and 22 are pigment particles distributed in the voids 23. As can be seen, in some instances a void 23 may contain one or more pigment particles 22.

Pigments may also be incorporated directly into the polymer matrix of the films of this invention rather than specifically within the voids as described above. This may be done by dispersing a pigment in the water phase of the latex rather than in the non-solvent. When the film is formed by using one of the above control techniques, the pigment particles are entrapped in the polymer matrix much in the same manner as the minute droplets of non-solvent are entrapped. Upon evaporation of the non-solvent a film is formed wherein the polymer matrix contains both pigment particles and minute discrete voids.

When white opacifying pigments are incorporated within the compositions, films, and coatings of this invention, the resulting compositions are more white and possess remarkably improved hiding than the prior art compositions while employing the same amount of white opaque pigment. In other words, less white opacifying pigment is needed to obtain the same degree of whiteness and hiding achieved by the prior art compositions.

When other opaque pigments are incorporated within the compositions, films and coatings, of this invention, the resulting compositions are more opaque then the prior art compositions while employing the same amount of opacifying pigment. In other words, less opaque pigment is needed to obtain the same degree of opacity achieved by the prior art compositions.

Among some of the opacifying pigments (known as "prime pigments") which may be incorporated within the films of this invention are titanium pigments, lead pigments, zinc pigments, antimony pigments, cadmium pigments, molybdenum pigments and iron pigments, just to mention a few. Specifically, white opaque pigments which may be employed, include anatase titanium dioxide, rutile titanium dioxide, basic carbonate white lead, basic sulfate white lead, basic silicate white lead, zinc oxide, leaded zinc oxide, zinc sulfide, lithopone, titinated lithopone and antimony oxide.

In especially preferred embodiments of incorporating pigments into the films of this invention, titanium dioxide ($TiO_2$) or antimony oxide ($Sb_2O_3$) are used as the pigments. Titanium dioxide pigments are preferred for purposes of this invention since these pigments have long been used as white opacifiers for polymeric films, paints etc. In prior systems, however, opacity was not optimized because, as hereinbefore described, optical opacify depends upon the ability of a pigment to scatter light. Since scattering depends upon the relative refractive indices of the pigment and its vehicle, the effect of the pigments was diminished in prior systems by the relatively high reflective index of the solid polymer films which surrounded it. Now, according to this invention, by forming voids in polymeric films as hereinabove described while at the same time incorporating a pigment such as $TiO_2$ or $Sb_2O_3$ into the matrix of polymer, the refractive index of the vehicle which surrounds the pigment if lowered since it is the average of the relatively high refractive index of the polymer and the lower refractive index of air. Thus, the opacifying affect of $TiO_2$ or $Sb_2O_3$ on a film is optimized by the opaque films of this invention. It is also understood, of course, that the pigments may be incorporated within the voids of the film as hereinbefore described and such an embodiment also constitutes a part of this invention.

Even though antimony oxide has a lower refractive index than $TiO_2$, it is in many cases the preferred white opacifying pigment because it has a lower absorption of light in the near ultraviolet region than $TiO_2$. Thus, it is possible to incorporate antimony oxide in conjunction with a fluorescent material into the films of this invention to obtain both an ultra white and fluorescent coating composition. The use of antimony oxide is particularly preferred when incorporated into the films of this invention which contain chlorinated organic compounds because an ultra white fire-retardant coating is produced which can be used where the coating is to be subjected to high temperatures such as on air and space craft, boiler tanks and the like.

It is also possible to incorporate known white extender pigments within the composition of this invention to achieve a whiteness only obtained by white opacifying pigments (prime pigments) when using the prior art compositions. The term "white extender pigments" is a term recognized by those skilled in the art. It refers to those pigments which are characterized by being white, near-white or colorless and having an index of refraction substantially below 1.75 (usually 1.45 to 1.70). Since most of the prior art films have an index of refraction in the range of 1.4 to 1.6, the white extender pigments must be used in conjunction with a prime pigment due to the fact that light scattering depends upon the relative refractive indexes of the pigment and its vehicle. Now, according to the films containing voids within the film structure, the effect of such pigments is upgraded to nearly that of a prime pigment. This is due to the voids within the film matrix, which lower the refractive index of the vehicle, since the refractive index which surrounds the pigments is the average of the relatively high refractive index of the polymer and the lower index of refraction of the air on vapor which is entrapped within the voids. Thus, the opacifying aggect of prime pigments is increased to a degree far superior to the prior art coatings, and extender pigments are capable of being upgraded to nearly that of prime pigments when incorporated within the compositions of this invention.

White extender pigments are well known in the art. Examples of white extender pigments which may be incorporated with the compositions of this invention are whitings ($CaCO_3$), gypsum ($CaSO_4$), magnesium silicate ($3MgO.SiO_2.H_2O$), magnesium carbonate ($MgCO_3$), China Clays ($Al_2O_3.2SiO_2.2H_2O$), mica ($K_2O.3Al_2O_3.6SiO_2.2H_2O$), silica ($SiO_2$), diatomaceous silica, barium sulfate ($BaSO_4$) barium carbonate ($BaCO_3$), and aluminum hydrate ($Al(OH)_3$). It will be understood that many other known white extender pigments may be used in accordance with the practice of this invention and the pigments indicated hereinabove are merely exemplary of the many which are known in the art.

It is possible to incorporate various known colored pigments into the films of this invention. Some red pigments which may be used in accordance with the practice of this invention are Indian red ($Fe_2O_3$), tuscan red, venetian red, red lead ($Pb_3O_4$), orange mineral, English vermilion ($HgS$), American vermilion (chrome red, scarlet lead chromate which is a basic chromate of lead), and lakes which are formed by combination of the coloring matter of certain dyes with inorganic carriers, such as $BaSO_4$, $CaSO_3$, or clay. Among the most important lakes are the vermilions and scarlets made from para red, and from alizarin. Examples of blue pigments which may be incorporated in the films of this invention are phthalocyanine blue, Prussian blue ($Fe[Fe(CN)_6]_3$) being the approximate empirical formula, ultramarine, cobalt blue, sublimed blue lead consisting mainly of $PbSO_4$ and $PbO$ with a minor amount of $PbS$, $PbSO_3$ and $ZnO$. Some of the preferred green pigments are phthalocyanine green, chrome green and chrome oxide green. It is also possible to incorporate some of the well known yellow pigments such as chrome yellows, yellow ochers and raw siennas. It is also contemplated by employing the practice of this invention to incorporate brown pigments such as burnt sienna, raw umber, burnt umber and vandyke brown, other wise known as cassel earth or cologne earth, which is a natural pigment of a carbonaceous nature and is distinguished by its solubility in dilute alkali.

It will be understood by those of skill in the art that many other pigments may be incorporated into films of this invention. The pigments indicated hereinabove are some of the more important pigments which may be used.

It may be noted that it has been unexpectedly found that by the addition of both non-solvent for the polymeric material in accordance with the present invention and pigment, such as $TiO_2$, to a latex composition, a synertistic effect is obtained. In other words, the resulting films are whiter and have stronger hiding power than a latex composition containing pigment without the addition of non-solvent. As indicated hereinabove, the addition of pigment is not needed to obtain an opaque coating, but it is desired to obtain a coating having stronger hiding power any amount of pigment may be added. Typically, the compositions containing non-solvent with pigment will contain about 0.1 to about 5 parts by weight of pigment to polymer solids. Preferably, the weight ratio of pigment to polymer solids will be from about 0.5 to about 3. However, when it is desirable to employ an only slightly volatile liquid as the non-solvent the weight ratio of pigment can be lowered.

A typical formulation utilizing a good film forming polymeric material may contain from about 0.1 to 2 parts liquid non-solvent to one part of polymer solids, and from about 0.5 to about 5 parts of pigment to one part of polymer solids. The flow and wet edge of the compositions of this invention are superior of those of the prior art, but they may be improved by the addition of a glycol, for example, in an amount between about 0.01 to about 2 parts per part of polymer solids.

In view of the increased hiding ability of the films of this invention, it is possible to formulate compositions containing relatively low proportions of non-volatiles, e.g., less than 25 volume percent, while maintaining the same hiding power and whiteness as the prior art compositions which contain substantially higher levels of non-volatiles.

Optical brighteners, fluorescent materials and mixtures thereof may also be incorporated within the films of this invention to effect their known characteristics upon the films. Optical brighteners are well known in the art and are generally defined herein as those materials which absorb appreciable light energy in the ultraviolet region of light and emit energy within the visible region of light. Thus, such materials serve to brighten the vehicles which carry them. Fluorescent materials are likewise well known in the art and are generally defined herein as those materials which absorb light energy in the ultraviolet and portions of the visible region of light and emit light energy of a given wave length (i.e., color) in the visible region of light. Thus, such materials brightly color the vehicles which carry them.

The incorporation of optical brighteners and fluorescent materials into the films of this invention achieve a unique effect. That is to say, films rendered white and opaque by the addition of $TiO_2$ thereto are only brightened or colored by the addition of optical brighteners and fluorescent materials to a limited degree. This is due primarily to the fact that $TiO_2$ screens substantially all of the ultraviolet light from the brightener or fluorescent material, since it absorbs ultraviolet light. Since films of this invention do not require the addition of $TiO_2$, the effect of optical brighteners and fluorescent materials incorporated into these films is maximized.

As mentioned above the use of antimony oxide as a pigment optimizes the whiteness of the films and in addition thereto does not screen the majority of ultraviolet light from the brightener or fluorescent material.

Optical brighteners and fluorescent materials may be incorporated either into the polymer matrix of the films of this invention or into the voids thereof in the same manner as pigments were incorporated therein. That is to say, particles of an optical brightener or fluorescent material may be dispersed either in the water phase of a polymer latex or in the non-solvent which is added to the latex to achieve the indicated affect when the film is formed by a given control technique as above described. Examples of optical brighteners and fluorescent materials useful in the films of this invention include such well known compounds as sodium 4,4'-bis(p-amino-benzamide)stilbene-2,2'-disulfonate, 4,4'-bis(benzoxazol-2-yl)stilbene, 4,4'-bis(6-methylsulfonylbenzoxazol-2-yl)stilbene; 4,4'-bis (5-methoxybenzoxazol-2-yl)stilbene, and such well known fluorescent pigments as finely powdered pink, orange, green, red or yellow organic pigments conventional in the art.

The compositions of this invention are useful as paint compositions and can be prepared at a lower initial cost than previous coating compositions which require the addition of higher levels of pigments in order to achieve adequate hiding and opacity. In other words, the compositions of this invention provide films having opacity and superior hiding by utilizing a non-solvent which has a lower initial cost than previous coating compositions which employ costly pigments. Therefore, the compositions of this invention are not only useful in that they are capable of producing opaque films in the absence of an opacifying pigment and produce a whiter film than previously obtained by the addition of the opacifying pigment with the non-solvent, but are also useful in a real commercial sense from the standpoint of raw materials. Thus, the present invention is a significant advance in the art.

The composition of this invention may be applied as films to various types of surfaces or substrates. These surfaces may be of the type whereby the film is to be removed by suitable method, such as by use of release coatings, or the type which is the final substrate, such as the wood of a house. Among the surfaces which may be coated with the compositions of this invention are steel, treated steel, galvanized steel, cement, glass, fabrics, wood, plasterboard, aluminum, treated aluminum and plastics.

The preferred films produced by the practice of this invention are characterized by the presence therein of a large number of discrete closed cells. Substantially all of these cells or voids are less than about 10 microns, and preferably less than 7 microns, in size. Films formed from the compositions of this invention contain closed cells essentially none of which are larger than about 30 microns. In other films the average size of the cells may be 0.5 micron.

A film having an apparent thickness of, for example, 10 mils will have a real solid thickness which is equal to the sum of the thickness of each wall between the discrete cells lying along a path perpendicular to the outermost planar surface of the film which may be, for example, no more than one mil. This property renders the films of this invention, particularly those having an average cell size of less than about 10 micron, useful as vapor or liquid permeation membranes which may be utilized for a number of applications such as, for example, in desalinazation processes. Thus, the film is of sufficient apparent thickness to provide the required amount of strength; yet the total thickness of solid polymer through which a molecule must pass (i.e., the cell walls) is relatively small.

Furthermore, a diffusion per unit of time of a vapor or liquid through a unit area of some of the films of this invention is far greater than that in the case of non-porous films heretofore available.

Certain preferred films of this invention reflect light of wave lengths below 3800 angstroms which makes them useful as ultraviolet light reflectors providing the polymer does not absorb light in the near ultraviolet range. Further, these films may be prepared to be of such whiteness as to be of use of light reflectance standards.

As indicated previously, the films of this invention have a Kubelka-Munk scattering coefficient greater than 0.5 reciprocal mils at 4400 angstroms and greater 0.1 reciprocal mils at 5600 angstroms in the absence of an opacifying agent. In determining whether a particular film falls under the aforementioned criteria, the films may be tested by methods known in the art, such as for example, by employing a recording spectrophotometer, equipped with a digital tristimulus integrator. The compositions to be tested may be applied at various controlled film thickness over white and black glass and over steel panels and allowed to dry thoroughly, and the total reflectance as well as the non-specular reflectances then measured.

The following examples serve to more fully describe the manner of making and using the above described invention as well as to set forth the best modes contemplated for carrying out various aspects of the invention. It is understood that these examples in no way serve to limit the true scope of this invention but rather are presented for illustrative purposes only. It will be understood that all proportions are in parts by weight and are based upon non-volatile solids content unless otherwise indicated.

EXAMPLE I

To 50 parts by weight of acrylic latex in which the coalescable polymer is a hard, non-film forming copolymeric of about 65% methyl methacrylate and 35% ethyl acrylate having a minimum film forming temperature of 102°F. ("C-72"), and containing 45% by weight polymer there are added 25 parts of an aliphatic hydrocarbon non-solvent for the acrylic polymer ("Isopar M" b.p. range 405° to 495°F.). The mixture is thoroughly agitated until the non-solvent ("Isopar M") is dispersed in the acrylic latex. Five portions of this dispersion are then drawn down, one portion on each of 5 consecutively numbered Alodene 1200 Aluminum Panels using a 0.070 wire wound drawbar. Each film so formed is held for 20 minutes at a different temperature to effect water and non-solvent removal therefrom. The results are as follows:

TABLE A

| Panel No. | Temp. °F. | Type Film Formed |
|---|---|---|
| 1 | 75 | Discontinuous powder |
| 2 | 95 | Continuous—white film, slightly flakey |
| 3 | 105 | Continuous—white film, good uniformity |
| 4 | 129 | Continuous clear film |

TABLE A-continued

| Panel No. | Temp. °F. | Type Film Formed |
| --- | --- | --- |
| 5 | 180 | Continuous clear film |

This example illustrates the temperature control technique of this invention that may be used to control the flow characteristics of a polymer system in order to effect different final films. Note in Table A that as the temperature during film formation is increased above the Tg temperature (102°F.) of the polymer, less and less non-solvent is entrapped and the resulting film is less and less opaque.

Although the above example illustrates the use of a non-film former, like control may be achieved when using marginal film formers and good film formers as well.

EXAMPLE II

To 50 parts of acrylic latex in which the coalescable polymer is a good film forming acrylic copolymer consisting of about 66% ethyl acrylate, 32% methyl methacrylate and 2% methacrylic acid ("Rhoplex AC-34" and containing 46% by weight of polymer solids) there are added, with agitation, 25 parts non-solvent ("Isopar M") and 2.25 parts of a finely ground transparent silica (Syloid 161). The purpose of adding the silica is to help non-solvent release. This agitated mixture is then drawn as a film similarly as described in Example I and dried at 75°F. to remove the non-solvent. Even with the small amount of flow retarding silica present, the flow of polymer continues after a substantial portion of the non-solvent has evaporated and the non-solvent is therefore not entrapped. The resulting film is a continuous clear film.

To the above-described basic agitated mixture is added with stirring an additional 5 parts of silica in order to inhibit flow. The mixture is then applied and drawn into a film. Upon evaporation of the non-solvent at 75°F. a continuous white, opaque film is formed having a Kubelka-Munk scattering coefficient greater than 0.5 reciprocal mils at 4400 angstroms and greater than 0.1 reciprocal mils at 5600 angstroms.

To this latter agitated solution is again added an additional 5 parts of silica in order to inhibit polymer flow to an even greater extent and 50 parts of water is added to allow a film to be drawn. The resulting coating, when dried at 75°F., is a continuous powder indicating that flow had been greatly inhibited.

The above example clearly illustrates the control technique of this invention wherein a flow-inhibiting agent is added to a good film former to control the characteristics of the final film and more preferably to optimize white opacity of a film made from a given polymer latex system. The example also illustrates that the composition must be capable of coalescing at room temperature (about 25°C.) or below in order to produce a continuous film which will entrap a sufficient quantity of non-solvent droplets in the quasi-rigid film.

EXAMPLE III

A mixture of 35 parts of the latex of Example I and 15 parts of the latex of Example II is formed to thereby obtain a marginal film forming latex system (i.e., a glass transition temperature (Tg) of approximately room temperature). To this mixture are added 25 parts non-solvent ("Isopar M") and 2.25 parts silica ("Syloid") to aid in the non-solvent release. After agitating this mixture, a first portion of it is drawn into a film as in Example I and dried at room temperature. The resulting film is continuous and white having an optimum Kubelka-Munk scattering coefficient.

A second portion of the above marginal film forming latex system is drawn into a film as described and dried at 37°F. The resulting coating is a powder and not a film.

To a third portion of the above marginal film forming latex system is added with thorough agitation, 4 parts of butyl benzyl phthalate, which is a plasticizer for the polymers. The resulting mixture is drawn as a film by the drawbar procedure of Example I and dried at room temperature. The resulting film is a clear film thus illustrating that the plasticizer increased flow to such an extent (i.e., lowered the glass transition temperatures (Tg) of the system) that insufficient non-solvent is entrapped in the film upon water removal therefrom.

This example illustrates that temperature, addition of plasticizers, e.c., and addition of non-film formers to good film formers may be used to control the flow characteristics of a polymer system in order to effect various characteristics of the final film. Also illustrated with reference to the second portion above is that temperature control and additive control can be used in combination to effect a desired final film.

The above Examples I – III, then clearly illustrates the controls disclosed hereinabove and combinations thereof which may be used to control the flow characteristics of polymeric materials which make up the solid discontinuous phase of a latex system. Once given these examples as well as the above description, many other combinations of these controls and/or films formers will become apparent with predictable results as indicated by the above-illustrated embodiments.

The following examples further illustrate this invention as it may be applied to various other polymer systems.

EXAMPLE IV

To 100 parts of a marginal film forming butadiene-styrene latex known as "Lytron 5202", having a glass transition temperature (Tg) of approximately room temperature, there are added with agitation 60 parts of odorless aliphatic mineral spirits (a non-solvent for the butadienestyrene copolymer having a b.p. range of 349° to 406°F., refractive index 1.4217 at 20°C., specific gravity 0.754 (60/60°F.) and a Kauri-Butanol value of 25.3) and 2 parts of a poly(oxyethylene)oxtyl phenol surfactant (known as "TX 305"). This mixture is then drawn as a film as per the drawbar procedure of Example I. The resulting film is semi-continuous with some white areas and some clear areas therein.

To the above mixture is then added one part of a methylvinyl ether-maleic anhydride adduct copolymer thickener (known as "Gantrez AN 139"). The mixture is again drawn as a film which after drying at room temperature is a semi-continuous film of generally uniform whiteness. When this mixture is brushed as a "paint" onto a wooden substrate, it forms a very white coating thereon after drying at room temperatures.

EXAMPLE V

A mixture of 80 parts of the marginal film former of Example IV ("Lytron 5202"), 20 parts of a good film forming acrylic latex ("Rhoplex AC-34"), 1.0 parts thickener, ("Gantrez AN-139"). 6 drops of a conventional anti-foam emulsion agent (e.g., Dow-Corning "H-10"), and 40 parts of odorless aliphatic mineral spirits (b.p. range 349° to 406°F.), is formed and thoroughly agitated. This mixture is then drawn by drawbar technique to a 3 mil thick film and is recoated after it dries. The resulting dry film is a poor, seedy-white film which improves slightly upon recoating.

The same mixture as above is again formulated except that 60 parts of the marginal film former and 40 parts of the good film former are now used. The resulting film, dried at room temperature is a white continuous film which becomes a much smoother white upon recoat.

EXAMPLE VI

A mixture of 100 parts of a latex containing 55% by weight of a good film forming vinyl acetate copolymer consisting of 75% vinyl acetate and 25% dibutyl maleate, 20 parts of spray satin clay (a flow inhibiting agent) and 40 parts of water is formed and agitated. To this mixture is added various amounts of non-solvent odorless aliphatic mineral spirits (b.p. range 349° to 406°F.) and the resulting mixture is drawn into a film and dried at room temperature to a 3 mil film. The results are as follows:

TABLE B

| Film | Amount of Non-Solvent Added (parts) | Type of Film Formed |
|---|---|---|
| A | 0 | Clear |
| B | 20 | Part White |
| C | 40 | More white than B |
| D | 60 | Good white |

This example clearly illustrates how flow may be retarded in a good film former by the addition of both a flow inhibiting agent and increasing amounts of non-solvents.

EXAMPLE VII

One hundred parts of the copolymer latex of Example VI is mixed with 3 parts of a clay slurry. The clay slurry, previously formulated, consists of 100 parts of spray satin clay, 50 parts of tap water and 2 parts polyether-phenol adduct surfactant ("TX-305"). To this mixture are added various amounts of odorless aliphatic mineral spirits (b.p. range 349° to 406°F.) in increments of 10 parts up to 40 parts. Upon drying none of the films drawn and dried at room temperature after each incremental addition of non-solvent, are white.

EXAMPLE VIII

To 100 parts of the copolymer latex of Example VI there are added 2 parts of spray satin clay and 40 parts of aliphatic odorless mineral spirits (b.p. range 349° to 406°F.). Upon forced-air drying at room temperature, a film formed from this mixture is very white and continuous. If 80 parts of the aliphatic odorless mineral spirits are added instead of 40 parts, the resulting film is only a fair and dull white.

EXAMPLE IX

To 100 parts of the copolymer latex of Example VI there are added 3 parts of a clay slurry consisting of 200 parts of spray satin clay, 100 parts of tap water, and 0.6 parts of the polyether-phenol adduct surfactant ("TX-305"). After the addition of various amounts of odorless aliphatic mineral spirits (b.p. range 349° to 406°F.), the following characteristics of a film formed by forced-air drying are noted:

TABLE C

| Film | Amount Non-Solvent (parts) | Type Film |
|---|---|---|
| A | 0 | Clear |
| B | 10 | Clear |
| C | 20 | White |
| D | 30 | White |
| E | 40 | White |

Examples VIII – IX and a comparison therebetween further illustrate how polymer flow may be controlled in a good film former by varying the amount of both the flow inhibiting agent and the non-solvent added thereto.

EXAMPLE X

A mixture of 400 parts of non-film forming vinyl acetate homopolymer latex and 200 parts of the good film-forming copolymer latex of Example VI is formed with agitation. To this mixture there are added with stirring various amounts of odorless aliphatic mineral spirits (b.p. range 340° to 406°F.), as a non-solvent mixed with small amounts of an ester surfactant. Each increment of mineral spirits is added slowly to the latex, i.e., over a period of approximately 15 minutes. The following results are noted:

TABLE D

| Film | Amount Non-Solvent (parts) | Amount Surfactant (parts) | Type Film |
|---|---|---|---|
| A | 100 | 2 | Very flexible, relatively clear, a few very large voids |
| B | 200 | 4 | Flexible, weak film, off-white |
| C | 300 | 6 | Flexible, very weak film, fair white |
| D | 400 | 8 | Stiff, extremely weak film, good white |

EXAMPLE XI

A mixture of 400 parts of the non-film forming latex of Example X, 200 parts of a good film forming latex of Example VI, and 20 parts of aqueous ammonia is formed. Over a period of 15 minutes a mixture of 200 parts of odorless aliphatic mineral spirits, 50 parts of toluene diisocyanate and 4 parts of stearic acid is added with stirring to the latex mixture. The resulting mixture is heated to a 150°F. and held for 10 minutes at this temperature with the addition of water to prevent coagulation. A film drawn from this solution is a continuous, white, waterresistant cross-linked film having discrete voids therein.

EXAMPLE XII

Various films having a thickness of 3 mils are drawn from the following mixtures:

| | | |
|---|---|---|
| A. | 100 parts | non-film forming acrylic latex ("Rhoplex AC-73") having a glass transition temperature of 99°F. |
| | 50 parts | odorless aliphatic mineral spirits (b.p. range 349° to 406°F.) |
| | 1.5 parts | butyl benzyl phthalate as a plasticizer |
| B. | 100 parts | non-film forming acrylic latex (as described above) |
| | 50 parts | odorless aliphatic mineral spirits |
| | 2.0 parts | butyl benzyl phthalate. |
| C. | 100 parts | non-film forming acrylic latex (as described above) |
| | 50 parts | odorless aliphatic mineral spirits |
| | 2.0 parts | dimethyl phthalate as a coalescing agent (volatizes from film). |
| D. | 100 parts | non-film forming acrylic latex |
| | 50 parts | odorless aliphatic mineral spirits |
| | 3.0 parts | dimethyl phthalate |
| E. | The same as D except 4.0 parts of dimethyl phthalate are used. | |

Films formed from these mixtures and dried at room temperature have the following characteristics:

Film A is least continuous of all the films. Films B – D have increased continuity with increasing whiteness. Film E is of generally the same continuity as Film D but is much whiter than D. Film E is continuous and very white.

EXAMPLE XIII

A mixture of 100 parts of the latex of Example VI, (50% by weight polymer solids) 17 parts of spray satin clay, 3 parts of $TiO_2$ finely ground pigment, and 40 parts of water is formed. To this mixture is then added with agitation 80 parts non-solvent odorless aliphatic mineral spirits (b.p. range 349° to 406°F.). This final mixture is then drawn into a film and dried at room temperature. The resulting film is an opaque white film having discrete voids therein and particles of $TiO_2$ dispersed throughout the polymer matrix.

EXAMPLE XIV

The same procedure is followed as in Example XIII except that instead of using $TiO_2$, 3 parts on an organic dye known as "Acetosol Blue GLS" are added by initially dispersing them in the odorless aliphatic mineral spirits. The film formed is a bright blue wherein a substantial portion of the discrete voids are coated with the dye.

EXAMPLE XV

The same procedure is followed as in Example XIII except that instead of $TiO_2$, 0.5 parts of Geigy brightener TINOPAL PCRP (a conventional organic brightener) are used. This brightener is added by dispersing it in the latex system. The resulting film exhibits increased brightness over a film not having the brightener therein.

EXAMPLE XVI

To 1000 parts of a latex containing good film forming copolymer of 75% vinyl acetate and 25% dibutyl maleate there are added gradually 900 parts of a non-solvent (mineral spirits, boiling range 300° – 400°F.) and the mixture is agitated rapidly. An additional 300 parts of the non-solvent are added with agitation and the composition is formed into a film and dried at about 77°F. The resulting film appears slightly opaque.

EXAMPLE XVII

The same procedure is followed as in Example XVI except that instead of adding mineral spirits of the non-solvent the same quantity of less volatile high flash aliphatic naphtha (b.p. range 450° to 500°F.) are added. The resulting film exhibits increased whiteness over the film of Example XVI.

EXAMPLE XVIII

Several latex paint formulations are prepared from a mixture of 200 parts of a latex of a good film forming acrylic copolymer of 43% methyl methacrylate, 55% butyl acrylate, and 2% methacrylic acid ("Rhoplex AC-388"), which contains 50% solids by weight and weights 8.85 pounds per gallon, 5.5 parts of a nonylphenol poly(oxyethylene) non-ionic surfactant; 40 parts of a water-soluble acrylic dispersant having 25% solids by weight, 4.0 parts of an anti-foam agent, 0.5 parts of a mercuric type fungicide, 0.3 parts of amine stabilizer and 165 parts of a thickener consisting of a 3% solution of hydroxyethylcellulose. The entire mixture is thoroughly mixed by agitation. Rutile titanium dioxide and a liquid non-solvent for the copolymer consisting of high flash aliphatic naphtha (b.p. range 450° to 500°F.) are added to each of the mixtures while stirring in the amounts shown in the Table below. After the addition of pigment and non-solvent to each one of the samples to be tested the total volume of each formulation is brought to a fixed volume of 100 gallons by the addition of hydroxyethylcellulose thickener solution and water in such a proportion as to attain a uniform viscosity of 85 to 95 Krebs Units in each of the formulations shown in the Table. Each of the formulations is drawn as a film using a 2 mil Bird applicator and dried at room temperature. The resulting films are thereafter evaluated by measuring their respective contrast ratios. The contrast ratio of a paint compares the total reflectance over a black substrate with the percent total reflectance over a white substrate, a value of 100% signifies complete hiding of the black substrate. The figures in the following Table represent the contrast ratio for the formulations containing the designated quantity of non-solvent and rutile titanium dioxide pigment.

TABLE E

| | Non-Solvent (parts by weight) | | | | |
|---|---|---|---|---|---|
| $TiO_2$ | 0.0 | 50.0 | 100.0 | 150.0 | 200.0 |
| (parts by weight) | Contrast Ratios | | | | |
| 0.0 | 3.0% | 43.8% | 53.3% | 64.7% | 73.0% |
| 50.0 | 73.0% | — | 85.0% | — | 90.6% |
| 100.0 | 84.3% | 92.6% | — | 94.2% | — |
| 150.0 | 90.3% | — | 94.8% | — | 97.4% |
| 200.0 | 90.8% | 95.2% | — | 97.1% | — |

It can be readily seen from the foregoing Table that superior results are attained in adding a non-solvent having a low volatility. It can also be observed that by adding both pigment and non-solvent to the latex formulation a synergistic effect is obtained whereby far superior hiding is achieved. It can also be seen from the foregoing Table that considerable hiding is obtained in the film containing no $TiO_2$. For example, by adding 200 parts of the low volatile non-solvent results in a film having the same hiding as a prior art film with 50 parts by weight $TiO_2$. Also, the combination of 50 parts of $TiO_2$ and 200 parts of non-solvent yields more hiding power than 150 parts of $TiO_2$ without the nonsolvent and almost as much as 200 parts of weight of $TiO_2$.

EXAMPLE XIX

The same procedure is followed as in Example XVIII except that a fixed quantity of phthalocyanine green pigment is added to each as a tint. The resulting films are evaluated in the manner described in Example XVIII, except that the "Tint Strength" values are measured. Tint strength is the ability of white pigments to hide colorants and this measurement leads to a direct measurement of opacity in paint films. Thus, a paint with 200% tint strength requires twice as much colorant to attain the same deepness of color as one with 100% tint strength. In other words, the paint having a 200% tint strength hides the tint (colorant) much more and is therefore much more opaque than a paint having a tint strength of 100%. The figures in the following Table represent the tint strength for each formulation which contains the designated quantity of non-solvent and rutile titanium dioxide pigment. The tint strength values are based on a composition containing 100 parts by weight of $TiO_2$ without any non-solvent added thereto.

TABLE F

| $TiO_2$ (parts by weight) | Non-Solvent (parts by weight) | | | | |
|---|---|---|---|---|---|
| | 0.0 | 50.0 | 100.0 | 150.0 | 200.0 |
| | Tint Strengths | | | | |
| 0.0 | 6.2% | 11.5% | 21.0% | 30.0% | 37.0% |
| 50.0 | 59.4% | — | 98.0% | — | 133.0% |
| 100.0 | 100.0% (Basis) | 151.0% | — | 207.0% | — |
| 150.0 | 124.0% | — | 205.0% | — | 314.0% |
| 200.0 | 143.0% | 243.0% | — | 320.0% | — |

It can be seen from the foregoing Table that when 200 parts of non-solvent are added to the formulation without any $TiO_2$ added as an opacifying agent, the resulting film hides up to the equivalent of over 30 parts of $TiO_2$. Furthermore, it can be seen that by the addition of 100 parts of $TiO_2$ and 50 parts of the low volatile non-solvent the resulting paint has a tint strength which is greater than the paint having 200 parts of $TiO_2$ and no non-solvent. Also, the formulation which has 50 parts of $TiO_2$ and 100 parts of non-solvent is essentially equivalent to the formulation having 100 parts by weight of $TiO_2$ and no non-solvent.

The synergistic effects of the non-solvent of this invention are clearly indicated by the foregoing Table, since even 200 parts of non-solvent contributes 37% tint strength without $TiO_2$ added to the formulation, and at each $TiO_2$ level even 50 parts by weight of non-solvent generates at least an increase of 50 to 100% in tint strength. At the 200 parts of non-solvent level utilizing 150 parts of $TiO_2$ in the formulation, the non-solvent (the void forming agent) contributes a 190% increase in tint strength, i.e., 314% vs. 124%.

EXAMPLE XX

The same procedure is followed as in Example XVIII except that only 3 parts by weight of brittle water soluble acrylic dispersant (25% solids by weight) are used instead of 40 parts by weight. The contrast ratios of the paints having the formulations are designated are set forth in the following Table. Each of the paints films evaluated were applied using a 2 mil Bird applicator.

TABLE G

| $TiO_2$ (parts by weight) | Non-Solvent (parts by weight) | | | |
|---|---|---|---|---|
| | 0.0 | 50.0 | 100.0 | 150.0 |
| | | Contrast Ratio | | |
| 0.0 | 3.1% | 4.2% | 30.4% | 14.9% |
| 50.0 | 70.0% | — | 85.0% | — |
| 100.0 | 82.0% | 87.0% | — | 90.0% |
| 150.0 | 87.0% | — | 93.0% | — |
| 200.0 | 88.0% | 94.0% | — | 96.0% |

EXAMPLE XXI

The same procedure is followed as in Example XIX except that only 3 parts by weight of brittle water soluble acrylic dispersant are used instead of 40 parts by weight. The tint strengths of the paints having the formulations as designed are set forth in the following Table.

TABLE H

| $TiO_2$ (parts by weight) | Non-Solvent (parts by weight) | | | |
|---|---|---|---|---|
| | 0.0 | 50.0 | 100.0 | 150.0 |
| | | Tint Strengths | | |
| 0.0 | 4.7% | 8.6% | 8.2% | 6.9% |
| 50.0 | 62.0% | — | 104.0% | — |
| 100.0 | 100.0% | 142.0% | — | 162.0% |
| 150.0 | 124.0% | — | 221.0% | — |
| 200.0 | 151.0% | 247.0% | — | 315.0% |

The results observed in Examples XX and XXI reveal that the contrast ratios for the $TiO_2$ free systems are very low, i.e., 3.1% to 30.4%, and the tint strengths for these materials are from 4.7% to 8.2%. However, when a level of 100 parts by weight of $TiO_2$ and 50 parts by weight of non-solvent are incorporated in the formulation, it can be seen that the non-solvent generates 42% of the tint strength. At a level of 200 parts of $TiO_2$ and 50 parts of non-solvent, the void forming non-solvent generates almost a 100% tint strength improvement over the paint which has been formulated without any non-solvent. Thus, a pure synergistic effect is demonstrated. In both Examples XX and XXI it can be seen that when 200 parts of $TiO_2$ are used along with 100 parts of latex solids, the additional 100 parts of $TiO_2$ is much less efficient than the first 100 parts of $TiO_2$. However, it can also be observed from the foregoing Tables that when 50 parts of non-solvent are placed in the paint formulation, the tint strength is increased by about 100% instead of by 50% as when no non-solvent is employed.

I claim:

1. A latex composition which forms continuous opaque films comprising:

A. an aqueous continuous phase containing dispersed therein in latex form a film-forming binder consisting essentially of substantially water-insoluble particles of coalescable polymer; and B. a liquid which is less volatile than water and which is a non-solvent for the coalescable polymer, which nonsolvent is present in an amount between about 0.5 and about 5 parts by weight of the non-solvent liquid per part of coalescable polymer; said non-solvent being of sufficiently low volatility as to be capable of producing a continuous, non-porous, microcellular and opaque film having minute, discrete and substantially closed voids, and in the absence of an opacifying agent, a Kubelka-Munk scattering coefficient greater than 0.5 reciprocal mil at 4400 angstroms and greater than 0.1 reciprocal mil at 5600 angstroms.

2. The composition of claim 1 wherein said non-solvent is a liquid aliphatic hydrocarbon.

3. The composition of claim 1 wherein said coalescable polymer is selected from the group consisting of acrylic polymers, copolymers of vinyl acetate with a minor amount of an ester of an unsaturated acid, and copolymers of vinyl aromatic hydrocarbons with alkyl acrylates or dienes.

4. The composition of claim 1 wherein said composition contains additives selected from the group consisting of fungicides, mildewcides, surfactants, flow modifiers, thickeners, free flow stabilizers, anti-skin agents, anti-floculants, and pH stabilizers.

5. The composition of claim 1 wherein said composition contains additives selected from the group consisting of pigments, dyes, fluorescent materials and optical brighteners.

6. A latex composition which forms continuous opaque films of high hiding power, comprising an aqueous continuous phase and particles of non-elastomeric coalescable polymer dispersed therein, said composition containing a. non-solvent for said non-elastomeric coalescable polymer which is present in a weight ratio of non-solvent to polymer solids of from about 0.05 to about 3:1.0, said non-solvent being of sufficiently low volatility as to be capable of producing a continuous, non-porous microcellular and opaque film having minute, discrete and substantially closed voids; and b. an opacifying pigment which is present in a weight ratio of pigment to polymer solids of from about 0.1 to about 5:1.0.

7. The composition of claim 6 wherein the total amount of nonvolatiles is less than about 25 volume percent.

8. The composition of claim 6 wherein said non-solvent is a liquid aliphatic hydrocarbon.

9. The composition of claim 6 wherein said coalescable polymer is selected from the group consisting of acrylic polymers, copolymers of vinyl acetate with a minor amount of an ester of an unsaturated acid, and copolymers of vinyl aromatic hydrocarbons with alkyl acrylates or dienes.

10. The composition of claim 6 wherein said composition contains an additive which is a member selected from the group consisting of fungicides, mildewcides, surfactants, flow modifiers, thickeners, free flow stabilizers, anti-skin agents, anti-floculants, pH stabilizers and mixtures thereof.

11. The composition of claim 6 wherein said coalescable polymer is a good film former and is a member selected from the group consisting of copolymers of vinyl acetate and dibutyl maleate or 2-ethylhexyl acrylate and copolymers of methyl methacrylate, butyl acrylate and methacrylic acid;

said non-solvent is a volatilizable aliphatic hydrocarbon which substantially boils above about 400°F.; and said opacifying pigment is a member selected from the group consisting of $TiO_2$ and $Sb_2O_3$.

12. The composition of claim 11 which contains an alkyl aryl polyether alcohol as a surfactant and ethylene glycol as a flow modifier.

13. The composition of claim 6 wherein said composition contains an additive which is a member selected from the group consisting of colored pigments, dyes, fluorescent materials and optical brighteners.

14. The composition of claim 11 wherein said composition contains an additive which is a member selected from the group consisting of colored pigments, dyes, fluorescent materials and optical brighteners.

* * * * *